United States Patent Office 3,362,978
Patented Jan. 9, 1968

3,362,978
PROCESS FOR REDISTRIBUTION OF SILICON-FLUORINE AND SILICON-HYDROCARBYLOXY BONDS
Bernard Kanner, Tonawanda, N.Y., assignor to Union Carbide Corporation, a corporation of New York
No Drawing. Filed Oct. 3, 1963, Ser. No. 313,428
2 Claims. (Cl. 260—448.8)

ABSTRACT OF THE DISCLOSURE

The invention is directed to a process for the redistribution of silicon-fluorine and silicon-hydrocarbyloxy bonds which comprises maintaining an organosilicon compound or mixture of organosilicon compounds, wherein at least two fluorine atoms are bonded to a single silicon atom and at least one hydrocarbyloxy group is bonded to a silicon atom, at a temperature sufficiently elevated to cause bond redistribution.

---

This invention relates to a process for redistribution of moieties bonded to silicon atoms. More particularly the invention is directed to a process for the redistribution of silicon-fluorine bonds and silicon-hydrocarbyloxy bonds in organosilicon compounds.

It has been discovered that an efficient and rapid redistribution of silicon-fluorine bonds and silicon-hydrocarbyloxy bonds takes place at moderate temperatures when an organosilicon compound (or mixture of organosilicon compounds) wherein at least two fluorine atoms are bonded to a single silicon atom and at least one hydrocarbyloxy group is bonded to a silicon atom is maintained at a temperature sufficiently elevated to cause bond redistribution. At least two fluorine atoms must be bonded to one and the same silicon atom because a single silicon-fluorine bond (or the last of two or more silicon-fluorine bonds) will not redistribute with silicon-bonded hydrocarbyloxy groups. For example, when phenyltrifluorosilane and methyltriethoxysilane are mixed together and maintained at room temperature, bond redistribution takes place with the production of an equilibrium mixture of products as shown by the following equation (not balanced):

(A) $\phi SiF_3 + MeSi(OEt)_3 \rightarrow \phi SiF(OEt)_2 + \phi SiF_2(OEt) + MeSiF(OEt)_2 + MeSiF_2(OEt) + MeSiF_3$ As used herein, $\phi$ represents the phenyl group, $C_6H_5$; Me represents the methyl group, $CH_3$; and Et represents the ethyl group, $C_2H_5$.

It is therefore, an object of this invention to provide a process for the redistribution of silicon-fluorine bonds and silicon-hydrocarbyloxy bonds in organosilicon compounds. A further object of the invention is to provide an efficient process for the production of a wide variety of fluorosilanes, hydrocarbyloxy silanes and mixed fluoro-hydrocarbyloxy silanes. These and other objects of the invention will be apparent from the following description and the appended claims.

The process of this invention comprises maintaining (a) an organosilicon compound containing at least one silicon-carbon bond or (b) a mixture of organosilicon compounds wherein at least one such compound contains a silicon-carbon bond (provided that in such organosilicon compound or mixture of organosilicon compounds there is at least one silicon atom having at least two fluorine atoms bonded thereto and at least one silicon atom having at least one hydrocarbyloxy group bonded thereto) at a temperature sufficiently elevated to cause redistribution of the silicon-fluorine and silicon-hydrocarbyloxy bonds. Where only one fluorine atom (or the last of several fluorine atoms) is bonded to a silicon atom, redistribution of this single silicon-fluorine bond with a silicon-hydrocarbyloxy bond will not take place.

Monomeric silanes which can be employed in the process of this invention can be presented by the formula:

(B)

wherein R is a divalent organic group; Y is hydrogen or functional substituent group, preferably fluoro, chloro, bromo, iodo, cyano,

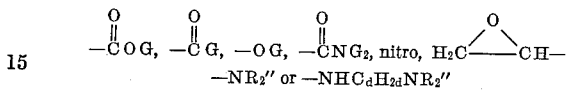

G is a monovalent hydrocarbon group; R' is hydrogen, the vinyl group or a Y—R— group; X is fluorine or a hydrocarbyloxy group —OG; R" is hydrogen, a G group or $C_dH_{2d}OH$; b is an integer having a value from zero to 3; c is an integer having a value from zero to 1; the sum of b and c is never greater than 3; and d is an integer having a value from 1 to about 6; provided that (I) any nitrogen atom in a Y group is separated from silicon by at least three carbon atoms of an —R— group, (II) when more than two X groups are fluorine, the nitrogen atom of any

moiety in a Y group is bonded to a carbon atom of a six membered fused or unfused aromatic ring system (that is, the

moiety is bonded to an aromatic ring carbon atom contained in an R group, an R" group or both such groups) and (III) when more than two X groups are fluorine, Y is not

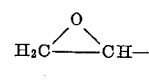

The functional group Y can also be

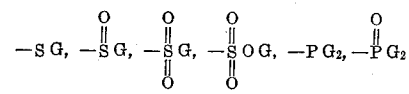

and the like, and, where not more than two X groups are fluorine, Y can be

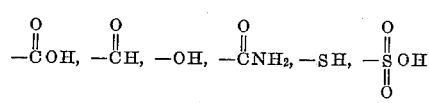

and the like.

The divalent organic group R is preferably a hydrocarbon group containing between 1 and about 17 carbon atoms. R can be, for example, an alkylene group such as methylene, ethylene, butylene(1,4), hexylene(1,2), 2-ethylhexylene(1,6), and the like, a cycloalkylene group such as cyclopentylene(1,3), cyclohexylene(1,4), 3-octylenecyclohexylene(1,4) and the like and an arylene or alkarylene group such as phenylene(1,4), naphthalene (1,4), 2-ethylphenylene(1,4),

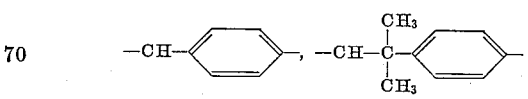

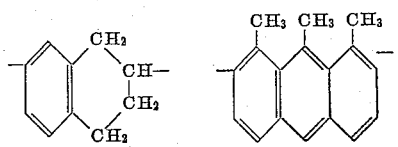

and the like, or an unsaturated group such as

—CH=CHCH$_2$—, —CH$_2$CH=CHCH$_2$— and the like. R can also be a heterocyclic organic group such as

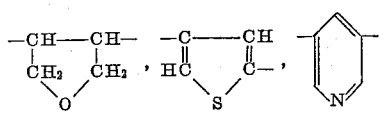

and the like.

The monovalent hydrocarbon group G is preferably one free of aliphatic unsaturation and containing from one to about 10 carbon atoms, for example, an alkyl, cycloalkyl, aryl or alkaryl group such as methyl, ethyl, isobutyl, hexyl, 2-ethylhexyl, cyclopentyl, 2-ethylcyclohexyl, phenyl, tolyl, mesityl, cumyl, naphthyl, and the like.

Illustrative compounds of Formula B which can be used in the process of this invention are tetra-ethylsilicate,
methyltriethoxysilane,
dimethyldiethoxysilane,
trimethylethoxysilane,
tetra-methylsilicate,
dimethyldimethoxysilane,
phenyltriethoxysilane,
dimethyldibutoxysilane,
diphenyldiethoxysilane,
phenylmethyldiphenoxysilane,
vinylmethyldiethoxysilane,
nitrophenylmethyltriethoxysilane,
beta-cyanoethyltriethoxysilane,
phenyldifluoroethoxysilane,
methyldifluorohexoxysilane,
difluorodiethoxysilane,
gamma-cyanopropylcyclohexenyldiethoxysilane,
methoxyphenyltriethoxysilane,
beta-cyanopropylphenyldimethoxysilane,
phenyltrifluorosilane,
diphenyldifluorosilane,
nitrophenyltrifluorosilane,
bis-nitrophenyldifluorosilane,
nitrophenylcyclopropyldifluorosilane,
cyanophenyltrifluorosilane,
methoxyphenylhexyldifluorosilane,
beta-cyanoethyltrifluorosilane,
gamma-cyanopropylmethyldifluorosilane,
vinylmethyldifluorosilane,
vinylphenyldifluorosilane,
allylmethyldifluorosilane,
p-aminophenylmethyldifluorosilane,
N-(beta-hydroxyethyl-beta-aminoethyl)-gamma-aminoisobutylmethyldifluorosilane,
gamma-glycidoxypropylmethyldiethoxysilane,
delta-sulfhydrylbutylmethyldifluorosilane,
p-(ethylsulfonyl)-phenylmethyldiethoxysilane,
gamma-diethylphosphonopropyltriethoxysilane,
beta-carbethoxyethyldifluorosilane,
delta-nitrobutylmethyldifluorosilane,
4-trifluorosilyl-N,N-dimethylbenzamide,
delta-bromobutyltripropoxysilane,
methoxyphenyltrifluorosilane,
silicon tetrafluoride,
cyclohexylvinyldiethoxysilane,
beta-cyanoethyltrifluorosilane,
gamma-chloroisobutyltrifluorosilane,
gamma-(N-methyl-N-phenyl-amino)propyltrifluorosilane,
beta-phenoxyethylmethyldiphenoxysilane,
nitronaphthylmethyldifluorosilane,
beta-phenylethyltrifluorosilane, and the like.

Linear and cyclic organopolysiloxanes can also be used in the process of this invention provided that in such polysiloxanes there are at least two fluorine atoms bonded to a single silicon atom and at least one hydrocarbyloxy group bonded to a silicon atom. Typical linear and cyclic polysiloxanes useful in this invention are those containing one or more units represented by the formula (C) 

and two or more units represented by the formula (D) 

wherein X, Y and R have the meanings defined with reference to Formula B above.

The redistribution process of this invention applies to mixtures of silanes, linear polysiloxanes and cyclic polysiloxanes provided that in such mixture there are at least two fluorine atoms bonded to a single silicon atom and at least one hydrocarbyloxy group bonded to a silicon atom.

The organosilicon compounds of Formula B hereinabove can be prepared as follows:

(a) Compounds of Formula B in which all of the X moieties are hydrocarbyloxy groups can be prepared by methods well known and understood by those skilled in organosilicon chemistry.

(b) Compounds of Formula B wherein all of the X moieties are fluorine atoms and wherein the Y groups are free from active hydrogen atoms or epoxy groups can be prepared by any of several methods set forth in French Patent No. 1,303,018 published July 30, 1962, and British Patent No. 912,448 published Dec. 5, 1962.

(c) Compounds of Formula B wherein Y is —NH$_2$ can be prepared by the reaction of the otherwise identical compound of Formula B wherein the Y group is the cyano group with hydrogen in the presence of a nickel hydrogenation catalyst. For example, gamma-aminopropylmethyldifluorosilane can be prepared by the reaction of beta-cyanoethylmethyldifluorosilane with hydrogen under pressure in the presence of Raney nickel catalyst. This type of reaction is also described in British Patent No. 882,096 published Nov. 8, 1961.

(d) Compounds of Formula B wherein the Y group is

—N⟨$\begin{matrix}R''\\R''\end{matrix}$ (one or both R'' groups not hydrogen) or —NHC$_d$H$_{2d}$R$_2$'' can be prepared by the reaction of the otherwise identical compound of Formula B wherein Y is chlorine, bromine or iodine with a primary or secondary amine, diamine, or hydroxysubstituted amine. For example, N-ethyl-gamma-aminopropylmethyldifluorosilane can be prepared by the reaction of gamma-chloropropylmethyldifluorosilane with ethylamine. This type of reaction is also described in U.S. Patent No. 3,033,815 and French Patent No. 1,297,045.

(e) Compounds of Formula B wherein the Y group is the epoxy group

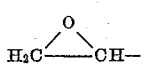

can be prepared by the reaction of an olefinically unsaturated epoxy compound with a fluorosilane containing a silicon hydrogen bond in the presence of a platinum catalyst. For example, gamma-glycidoxypropylmethyldifluorosilane can be prepared by the reaction of allylglycidyl ether with methyldifluorosilane in the presence of platinum on gamma-alumina as a catalyst. This type of reaction is also described in U.S. Patent No. 2,946,701.

(f) Compounds of Formula B containing both silicon-bonded fluorine atoms and silicon-bonded hydrocarbyloxy groups can be prepared by the reaction of an alcohol GOH, wherein G has the meaning defined hereinabove, with a mixed chlorofluorosilane. The mixed chlorofluorosilane can be prepared by the methods of French Patent No. 1,303,018. Controlled amounts of alcohol (one mole of alcohol per mole of silicon-chlorine bond) will then react selectively with the silicon-chlorine bonds to give a compound containing both silicon-bonded fluorine atoms and silicon-bonded hydrocarbyloxy groups. For example, gamma - chloropropylmethylfluoroethoxysilane can be prepared by the reaction of gamma-chloropropylmethylfluorochlorosilane with ethanol in a one-to-one mole ratio, and beta-cyanoethylmethylfluoromethoxysilane can be prepared by the reaction of beta-cyanoethylmethylfluorochlorosilane with methanol in a one-to-one mole ratio.

The linear and cyclic polysiloxanes containing units of Formulas C and D can be prepared by conventional methods such as hydrolysis and condensation of silanes of Formula B.

The redistribution reaction of this invention can be carried out with or without the use of a solvent. In general, the use of a solvent is not required. However, inert liquid organic solvents can be used if desired and are often advantageous where two or more reactants are mutually soluble in the solvent but not soluble in one another. The term "inert," as used herein, means that the solvent does not react with silicon-fluorine bonds, silicon-hydrocarbyloxy bonds or with the various functional groups on the organic portions of the organosilicon compounds. Examples of inert liquid organic solvents which can be used in the process of this invention are aromatic hydrocarbons such as benzene, toluene, xylene, cumene, and tetrahydronaphthalene, aliphatic hydrocarbons such as heptene, octane and petroleum ether, and ethers such as dimethyl ether, dibutyl ether, dioxane, tetrahydrofuran, ethylene glycol dimethyl ether and diethylene glycol dimethyl ether, and the like.

The temperature at which the process of this invention takes place is not critical so long as the temperature is sufficiently elevated to cause redistribution of the silicon-fluorine and silicon-hydrocarbyloxy bonds. A preferred temperature range is from about $-10°$ C. to about $275°$ C. with a range from $20°$ C. to about $200°$ C. being most preferred.

The time necessary to effect redistribution of silicon-fluorine and silicon-hydrocarbyloxy bonds by the process of this invention is likewise not critical. The exact time required to form an equilibrium mixture of redistributed products varies, of course, with the temperature and the nature of the organosilicon compounds. In general, an equilibrium mixture of redistributed products is formed in about 1 to 5 hours.

Pressure is also not a critical factor in the process of this invention. The most convenient pressure for carrying out the process is normal atmospheric pressure. However, the reaction can be carried out under pressure if desired, and it is frequently advantageous to use sub-atmospheric pressures in order to remove relatively more volatile products from the reaction mixture.

The redistribution process of the present invention does not require the presence of two different organosilicon compounds. A single compound is sufficient as long as it contains at least two silicon-bonded fluorine atoms and at least one silicon-bonded hydrocarbyloxy group.

For example, when phenyldifluoroethoxysilane is heated at about $150°$ C., an equilibrium mixture of phenylfluorodiethoxysilane, phenyldifluoroethoxysilane and phenyltrifluorosilane is formed.

As used herein the terms "fluorosilane" and "hydrocarbyloxy silane" refer to compounds containing silicon-fluorine bonds and silicon-hydrocarbyloxy bonds, regardless of the functional groups present in the organic portion of the molecule. Thus, gamma-fluoropropyltriethoxysilane is a hydrocarbyloxysilane and gamma-methoxypropyltrifluorosilane is a fluorosilane.

The redistribution reaction of the present invention can be driven to completion thus providing an efficient method for the production of a wide variety of organosilicon compounds containing silicon-fluorine bonds, silicon-hydrocarbyloxy bonds or both such bonds. In general, the redistribution reaction of the invention can be driven to completion by using a stoichiometric excess of one of the reactants or by removing one or more of the more volatile products from the reaction mixture.

The particular methods by which the redistribution reaction of this invention is driven to completion and the particular methods by which the products of the redistribution reaction are separated and isolated depend, therefore, on the nature of the individual reaction mixture, and the appropriate procedures in each instance will be readily apparent to those skilled in organosilicon chemistry. For example, in the reaction depicted in Equation A hereinabove, the use of a stoichiometric excess of $MeSi(OEt)_3$ and the removal from the reaction mixture of the relatively more volatile products results in substantially complete conversion of $\phi SiF_3$ to $\phi SiF(OEt)_2$. Several additional illustrative procedures are set forth in the examples hereinbelow.

The compounds produced by the redistribution process of this invention have a variety of uses well known and understood by those skilled in organosilicon chemistry. The silanes of Formula B and siloxanes containing units of Formulas C and D, wherein all X groups are hydrocarbyloxy groups, have a variety of uses which have been described in the technical and patent literature. Silanes of Formula B and siloxanes containing units of Formulas C and D wherein some or all of the X groups are fluorine have the same useful properties as the corresponding hydrocarbyloxy silicon compounds. In addition, silanes of Formula B, wherein some or all of the X groups are fluorine, can be hydrolyzed by conventional procedures to yield organofunctional polysiloxanes which do not contain silicon bonded fluorine atoms, and the uses of such organo functional polysiloxanes are well known and understood.

The following illustrative examples are presented. In the examples, "B.P." represents boiling point (at one atmosphere pressure unless otherwise indicated, "$n_D{}^{25}$" represents refractive index at $25°$ C. with reference to the sodium "D" line, and "mm. Hg" is the pressure in millimeters of mercury.

*Example 1*

Into a 500 ml. 3-necked flask fitted with stirrer, condenser, thermometer and gas vent to the atmosphere (protected by a calcium chloride drying tube) was charged 163.5 g. (0.79 mole) of p-nitrophenyltrifluorosilane and 165 g. (0.79 mole) of tetra-ethylsilicate. The mixture was heated at reflux temperature with stirring for 4 hours. Fractional distillation of the reaction mixture at reduced pressure through a Vigreaux column yielded 191.6 g. (0.76 mole) of p-nitrophenylfluorodiethoxysilane, $NO_2\phi SiF(OEt)_2$, in 96 mole percent yield; B.P. 84–86° C./0.01 mm. Hg, $n_D{}^{25}=1.4765$, 7.5 weight percent hydrolyzable fluorine (theory, 7.6 weight percent).

*Example 2*

Following the procedures of Example 1, p-nitrophenyltrifluorosilane and phenyltriethoxysilane were mixed and heated at the reflux temperature of the mixture. Fractional distillation of the reaction mixture gave as principal products p-nitrophenylfluorodiethoxysilane and phenyltrifluorosilane.

Example 3

Into a 500 ml. distillation flask fitted with an 18 inch packed column for distillation was charged 208.4 g. (1 mole) of tetraethylsilicate and 158.2 (1 mole) of phenylmethyldifluorosilane. The mixture was heated at reflux temperature for four hours. Fractional distillation of the reaction mixture gave: (a) 5 g. of difluorodiethoxysilane, $F_2Si(OEt)_2$, B.P. 83–85° C., (b) 76 g. of fluorotriethoxysilane $SiF(OEt)_3$, B.P. 134–135° C., (c) 120 g. of unreacted $Si(OEt)_4$ and (d) 161 g. (0.88 mole) of phenylmethylfluoroethoxysilane, $\phi SiMeF(OEt)$, in 88 mole percent yield; B.P. 181–185° C./750 mm. Hg.

Example 4

Following the procedures of Example 3, phenyltrifluorosilane and tetra-ethylsilicate were mixed and heated at the reflux temperature of the mixture. Fractional distillation of the reaction mixture gave phenylfluorodiethoxysilane as the principal product.

What is claimed is:

1. The process which comprises forming a mixture of about 1 mole of p-nitrophenyltrifluorosilane and about 1 mole of tetraethylsilicate, heating said mixture at its boiling point to cause redistribution of the silicon-fluorine and silicon-ethoxy bonds in said mixture and separating p-nitrophenylfluorodiethoxysilane from the redistributed mixture.

2. The process which comprises forming a mixture of about 1 mole of phenylmethyldifluorosilane and about 1 mole of tetraethylsilicate, heating said mixture at its boiling point to cause redistribution of the silicon-fluorine and silicon-ethoxy bonds in said mixture and separating phenylmethylfluoroethoxysilane from the redistributed mixture.

References Cited

UNITED STATES PATENTS

| | | | |
|---|---|---|---|
| 2,626,273 | 1/1953 | Hunter et al. | 260—448.2 |
| 2,735,861 | 2/1956 | Erickson et al. | 260—448.2 |
| 3,054,817 | 8/1962 | Pepe et al. | 260—448.2 |
| 3,128,297 | 4/1964 | Kanner et al. | 260—448.2 |

OTHER REFERENCES

Jacovic, Milhailo: Chimie et Industries, volume 82, No. 5, November 1959, pp. 687–689.

TOBIAS E. LEVOW, *Primary Examiner.*

P. F. SHAVER, *Assistant Examiner.*